United States Patent
Kamalaksha

(10) Patent No.: US 7,962,553 B2
(45) Date of Patent: Jun. 14, 2011

(54) METHOD AND SYSTEM FOR DISTRIBUTION OF MAINTENANCE TASKS IN A MULTIPROCESSOR COMPUTER SYSTEM

(75) Inventor: Venkataraman Kamalaksha, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 11/826,884

(22) Filed: Jul. 19, 2007

(65) Prior Publication Data

US 2008/0028407 A1 Jan. 31, 2008

(30) Foreign Application Priority Data

Jul. 31, 2006 (IN) .......................... 1341/CHE/2006

(51) Int. Cl.
G06F 15/16 (2006.01)
G06F 15/00 (2006.01)
(52) U.S. Cl. .......... 709/205; 709/201; 709/204; 712/34; 712/200
(58) Field of Classification Search .................. 709/201, 709/204–205; 710/267; 712/30–34, 200–203
See application file for complete search history.

(56) References Cited

U.S. PATENT DOCUMENTS

| | | | | |
|---|---|---|---|---|
| 5,867,704 A * | 2/1999 | Tanaka et al. | ................. | 718/105 |
| 7,669,036 B2 * | 2/2010 | Brown et al. | .................... | 712/30 |
| 7,743,376 B2 * | 6/2010 | Selvaggi et al. | ............... | 718/100 |
| 7,805,550 B2 * | 9/2010 | Kimelman et al. | ............... | 710/46 |
| 2002/0023117 A1 * | 2/2002 | Bernardin et al. | ............ | 709/104 |
| 2002/0188713 A1 * | 12/2002 | Bloch et al. | .................... | 709/223 |
| 2003/0097508 A1 * | 5/2003 | Aneshansley | ................. | 710/302 |
| 2003/0120702 A1 | 6/2003 | Jahnke | | |
| 2003/0204547 A1 | 10/2003 | Davis et al. | | |
| 2003/0208467 A1 | 11/2003 | Kahn et al. | | |
| 2003/0233392 A1 | 12/2003 | Forin et al. | | |
| 2004/0019891 A1 | 1/2004 | Koenen | | |
| 2006/0274662 A1 * | 12/2006 | Tannenbaum | ................ | 370/242 |
| 2007/0011300 A1 * | 1/2007 | Hollebeek et al. | ............ | 709/224 |
| 2007/0168525 A1 * | 7/2007 | DeLeon et al. | ............... | 709/228 |
| 2007/0192568 A1 * | 8/2007 | Fish, III | ........................ | 712/200 |

* cited by examiner

Primary Examiner — Joshua Joo

(57) ABSTRACT

A method for distributing low-priority maintenance tasks in a computer system employing a plurality of central processing units. In an illustrative embodiment, an activity flag is assigned to each of the plurality of central processing units. After a network packet is received, it is processed in one of the plurality of central processing units and the maintenance tasks are assigned to a central processing unit based on the status of its activity flag.

9 Claims, 2 Drawing Sheets

METHOD AND SYSTEM FOR DISTRIBUTION OF MAINTENANCE TASKS IN A MULTIPROCESSOR COMPUTER SYSTEM

This application claims priority from Indian patent application 1341/CHE/2006, filed on Jul. 31, 2006. The entire content of the aforementioned application is incorporated herein by reference.

BACKGROUND OF THE INVENTION

The present invention relates in general to multiprocessor computer systems and, in particular to a method for distribution of maintenance tasks in a multiprocessor computer system.

A computer system refers to the hardware and software components that run a computer or computers.

Most computers have a central processing unit (CPU) that serves as the main logic and control unit of a computer. The terms processor and CPU are often used interchangeably.

A modern CPU consists of a single, tiny chip of specially produced silicon (usually a square centimeter or less) on the top surface of which are formed millions of transistors and other circuit elements using a sub-micron fabrication process. Each chip is housed in a high precision ceramic or plastic package and mounted on the motherboard (i.e., the main circuit board on a computer).

Although most personal computers have a single CPU, some high performance computers have multiple CPUs in order to further increase processing throughput (i.e., the amount of data that can be processed per unit of time). Computers also contain other microprocessors, such as those in disk drives and other peripheral devices.

A CPU contains three main sections: (1) an arithmetic/logic unit, (2) a control unit and (3) registers. The arithmetic/logic unit contains circuitry that performs data manipulation. The control unit consists of circuitry for coordinating the machine's activities. The registers are high speed memory cells that are used for holding instructions for data that is currently being processed.

The CPU reads data from the main memory, which consists of RAM (random access memory) chips, by supplying the addresses of the appropriate memory cells along with a read signal. Likewise, it writes data to memory by providing the addresses of the destination cells together with a write signal.

A multiprocessor computer system refers to a computer system in which two or more CPUs share access to a common memory.

Multiprocessor system is a generic term for the use of two or more central processing units (CPUs) within a single computer system. It refers to a computer system's ability to support more than one process (program) at the same time.

In a multiprocessor system, all CPUs may be equal, or some may be reserved for special purposes. A combination of hardware and operating-system software design considerations determines the symmetry in a given system. For example, hardware or software considerations may require that only one CPU respond to all hardware interrupts, whereas all other work in the system may be distributed equally among CPUs; or execution of kernel-mode code may be restricted to only one processor, whereas user-mode code may be executed in any combination of processors. Multiprocessor systems are often easier to design if such restrictions are imposed, but they tend to be less performing than systems in which all CPUs are utilized equally.

This multiprocessor system may be further understood as one of parallel-processing computer systems.

Parallel processing operations imply that processing operations which have been performed by a single processor employed within the conventional computer are performed in a parallel form by parallel-operating plural processors. As a result, high speed processing operations may be realized.

On a computer with multiple CPUs and multiple network interface cards, each network interface card can be programmed to interrupt a specific CPU whenever it receives a packet from the network. The Transmission Control Protocol/Internet Protocol (TCP/IP) stack on the operating system processes the received network packets. As part of processing the network packet, the stack needs to start certain tasks that execute at a later time. These are called "maintenance tasks" which perform operations that are critical to keep the TCP/IP stack functioning properly and also to ensure trouble free functioning of the operating system. The TCP/IP stack does this by instructing the operating system to execute a specific function at a specific time. This function does the maintenance tasks. The operating system executes the specified function at the specified time on the same CPU that did the processing of the network packet. It does this by generating a low priority interrupt at the specified time, which will then execute the function that contains the code for doing the aforementioned maintenance.

The interrupt generated by the network interface card is of a higher priority than the one generated by the operating system for executing the function that was specified by the TCP/IP stack. Hence, it follows that the operating system executes the function that does the maintenance only after all the network packets have been processed.

When there is incessant network traffic and network packets continue to arrive at a very high rate, the CPU that is programmed to service the network interface card is constantly interrupted. This could cause a situation where the function that is to be executed to perform the maintenance never actually gets executed at the specified time because as mentioned previously, the interrupt that is generated to execute this function is of a lower priority compared to the interrupt generated by the network interface card. Given sufficient time, the number of these pending maintenance tasks could steadily increase, negatively affecting the proper functioning of the stack and the operating system in general.

BRIEF DESCRIPTION OF THE DRAWINGS

An embodiment of the invention will now be described, by way of example only, with reference to the accompanying drawings in which.

DETAILED DESCRIPTION OF THE PREFERRED EMBODIMENT

Figure 1:
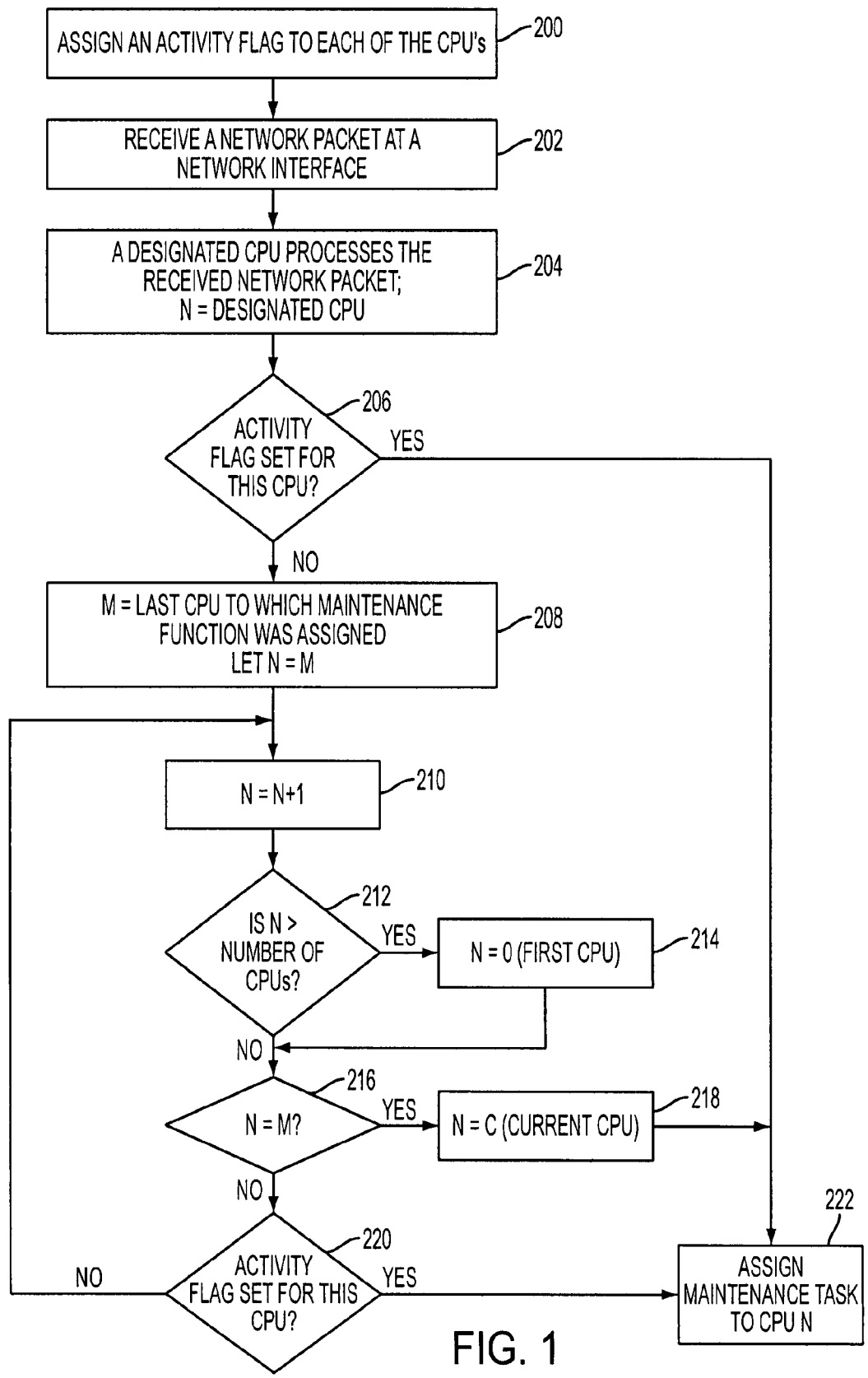
FIG. 1 is a flow chart that illustrates a method in accordance with an embodiment of the present invention.

FIG. 1 is a flow chart of an embodiment of a method for distribution of maintenance tasks in a multiprocessor system.

At block 200, each of the central processing units of a multiprocessor computer system connected to a computer network is assigned an activity flag. The activity flag of a central processing unit acts as an indicator of the status of maintenance tasks previously assigned to that central processing unit. If the activity flag of a particular central processing unit is set, it indicates that the maintenance tasks assigned to it previously have been executed and the central processing unit is available again for further assignment of any maintenance tasks. If the flag is not set, it indicates that the maintenance tasks are still pending at that central processing unit. Accordingly, the activity flag can be used to know whether a given CPU has executed the maintenance tasks it was assigned.

At block 202, a network interface card of a multiprocessor computer system receives a network packet and interrupts the central processing unit designated to service the received packet. On a computer with multiple CPUs and multiple network interface cards, each network interface card can be programmed to interrupt a specific CPU whenever it receives a packet from the network At block 204, the designated, or rather, the interrupted central processing unit suspends the current task and proceeds to service the newly arrived packet. Let N=the designated CPU. The TCP/IP stack processes the network packet and determines the time for carrying out the maintenance tasks.

At block 206, the TCP/IP stack checks the activity flag of the interrupted central processing unit. If the activity flag for the interrupted central processing unit is set, the maintenance tasks are assigned to the interrupted central processing unit 218.

Every time the maintenance task is assigned to a particular central processing unit, a global variable called the "Callback CPU" is updated with the id of the central processing unit. This is useful to determine which central processing unit was assigned the maintenance task last and which central processing unit should be used next. As stated previously, the "set" status of an activity flag for a central processing unit indicates that this central processing unit has executed the previously assigned maintenance tasks and is available.

The assigned maintenance tasks are low priority maintenance tasks such as, but not limited to, deletion of memory object and updating of memory objects with new information based on announcement of network events including, but not limited to, hardware address changes, a network node not reachable and maximum packet size a network node can handle to other modules of the operating system.

If the activity flag for the interrupted central processing unit is not set, it means that the interrupted central processing unit has not executed the previously assigned maintenance tasks and hence they have to be assigned to another central processing unit on the multiprocessor computer system.

At block 208, the global variable "Callback CPU" is read to find out to which central processing unit the last maintenance task was assigned. Let this number be M.

At blocks 210, 212, 214, 216, 218 and 220, starting from (N+1), the activity flag of each of the remaining central processing units of the computer system is checked until a central processing unit is found whose activity flag is set. The maintenance task is assigned to this central processing unit at block 222.

If no central processing unit is found whose activity flag is set, it means that all central processing units on this computer system are busy and the maintenance task can be assigned to any processor. Hence, the maintenance task is assigned to the interrupted central processing unit itself at block 222.

It would be appreciated that the above described method ensures better system performance by providing load balancing among available CPUs in a multiprocessor computer system thereby leading to efficient utilization of system resources. It also allows network packets to be processed by the CPU that is assigned to service the network interface card without the burden of having to run other tasks.

The above embodiment of the present invention can be implemented in software, which may be run in any suitable computing environment such as, but not limited to, personal computers, server computers, network computers, hand-held devices or any other computing device.

Further, the above embodiment of the present invention can be embodied in any-computer readable medium for use by or in connection with a computer system that can retrieve the instructions and execute them. A computer readable medium can include, but is not limited to, a random access memory (RAM), a portable compact disc read-only memory (CDROM), a computer diskette (magnetic) or any other computer readable medium.

Figure 2:
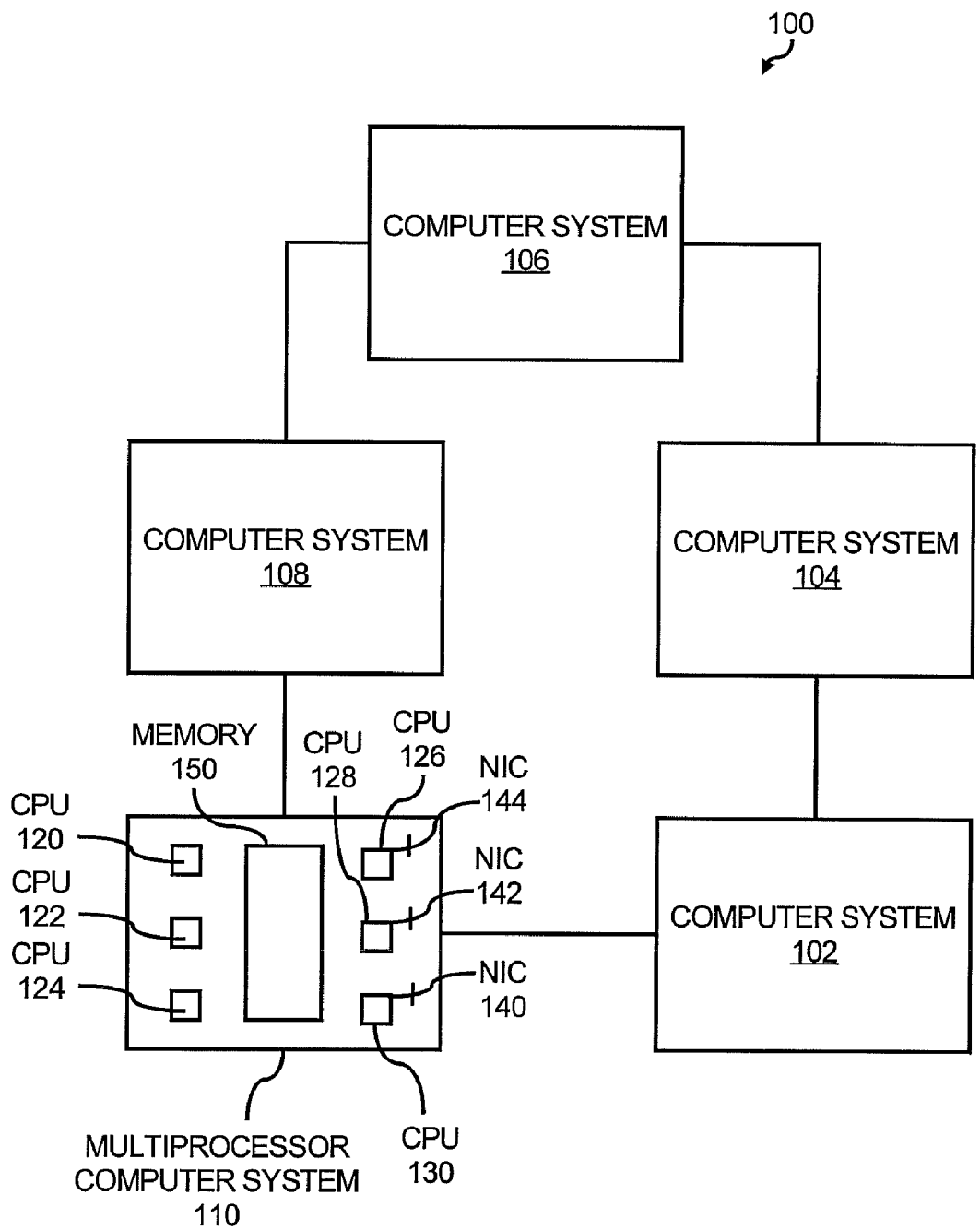
FIG. 2 illustrates an exemplary computer network with a multiprocessor computer system.

FIG. 2 shows an example of a suitable computing system environment for implementing embodiments of the present invention.

The computer network 100 generally includes a plurality of computer systems 102, 104, 106 and 108, with at least one multiprocessor computer system 110.

The multiprocessor computer system 110 generally includes a plurality of central processing units (CPUs) 120, 122, 124, 126, 128 and 130, and a plurality of network interface cards 140, 142 and 144. The plurality of central processing units have access to a common memory 150.

While the present embodiment illustrates five computer systems 102, 104, 106, 108 and 110, the number of computer systems may vary depending on the computer network. Similarly, while the present embodiment illustrates six central processing units and three network interface cards in the multiprocessor computer system 110, the number of central processing units and network interface cards may vary depending on the multiprocessor computer system.

On a computer system with multiple central processing units and multiple network interface cards, each network interface card can be programmed to interrupt a specific central processing unit whenever it receives a packet from the computer network.

The computer network can include, but is not limited to, a local area network (LAN), wide-area network (WAN), home-area networks (HAN), metropolitan-area network (MAN), personal-area network (PAN), wireless network, the internet or any other computer network.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

The invention claimed is:

1. A method for distributing maintenance tasks in a computer system employing a plurality of central processing units, said method comprising the steps of:
    assigning an activity flag to each of the plurality of central processing units, wherein the activity flag indicates a status of the maintenance tasks, wherein the maintenance tasks are previously assigned to each of the plurality of central processing units, wherein the maintenance tasks are configured to keep functions of a Transmission Control Protocol/Internet Protocol (TCP/IP) stack operating properly;
    receiving a network packet;
    interrupting one of the plurality of central processing units to process the network packet;
    processing the network packet in one of the plurality of central processing units interrupted to process the received network packet;
    determining the activity flag of the interrupted central processing unit;
    assigning the maintenance tasks to the interrupted central processing unit if the activity flag of the interrupted central processing unit is set; and
    assigning maintenance tasks previously assigned to the interrupted central processing unit to another central processing unit of the plurality of central processing units if the activity flag of the interrupted central processing unit is not set.

2. The method of claim 1, wherein the step of assigning the maintenance tasks previously assigned to the interrupted central processing unit to another central processing unit of the plurality of central processing units comprises the steps of:

updating a global variable with an id of the interrupted central processing unit or with an id of the another central processing unit to which the maintenance tasks have been assigned;

checking the global variable to identify to which central processing unit of the plurality of central processing units the last maintenance tasks were assigned;

determining whether the global variable assigned is greater than the plurality of central processing units;

assigning the maintenance tasks to the interrupted central processing unit if the global variable assigned is greater than the plurality of central processing units; and assigning the maintenance tasks to another central processing unit of the plurality of central processing units, other than the interrupted central processing unit, whose activity flag is set.

3. The method of claim 1, wherein the network packet is received at a network interface.

4. The method of claim 1, wherein the maintenance tasks previously assigned to each of the plurality of central processing units are low priority maintenance tasks.

5. The method of claim 4, wherein the low priority maintenance tasks include deletion of memory objects and updating of memory objects with information based on announcement of network events.

6. A non-transitory computer readable medium for storing a computer program comprising instructions for:

assigning an activity flag to each of a plurality of central processing units employed by a computer system, wherein the activity flag indicates a status of maintenance tasks previously assigned to each of the plurality of central processing units, and wherein the maintenance tasks are configured to keep functions of a Transmission Control Protocol/Internet Protocol (TCP/IP) stack operating properly;

receiving a network packet;

interrupting one of the plurality of central processing units to process the network packet;

processing the network packet in one of the plurality of central processing units interrupted to process the received network packet;

determining the activity flag of the interrupted central processing unit;

assigning the maintenance tasks previously assigned to each of the plurality of central processing units to the interrupted central processing unit if the activity flag of the interrupted central processing unit is set; and assigning maintenance tasks previously assigned to the interrupted central processing unit to another central processing unit of the plurality of central processing units if the activity flag of the interrupted central processing unit is not set.

7. The non-transitory computer readable medium of claim 6, wherein assigning the maintenance tasks previously assigned to the interrupted central processing unit further comprises instructions for:

updating a global variable with an id of the interrupted central processing unit or with an id of the another central processing unit to which the maintenance tasks have been assigned;

checking the global variable to identify to which central processing unit of the plurality of central processing units the last maintenance tasks were assigned;

determining whether the global variable assigned is greater than the plurality of central processing units;

assigning the maintenance tasks to the interrupted central processing unit if the global variable assigned is greater than the plurality of central processing units; and assigning the maintenance tasks to another central processing unit of the plurality of central processing units, other than the interrupted central processing unit, whose activity flag is set.

8. A computer system comprising:

a plurality of central processing units;

at least one network interface card; and a common memory coupled to the plurality of central processing units;

said computer system being configured to perform a method comprising:

assigning an activity flag to each of the plurality of central processing units, wherein the activity flag indicates a status of maintenance tasks previously assigned to each of the plurality of central processing units, and wherein the maintenance tasks are configured to keep functions of a Transmission Control Protocol/Internet Protocol (TCP/IP) stack operating properly;

receiving a network packet;

interrupting one of the plurality of central processing units to process the network packet;

processing the network packet in one of the plurality of central processing units interrupted to process the received network packet;

determining the activity flag of the interrupted central processing unit;

assigning the maintenance tasks previously assigned to each of the plurality of central processing units to the interrupted central processing unit if the activity flag of the interrupted central processing unit is set; and assigning maintenance tasks previously assigned to the interrupted central processing unit to another central processing unit of the plurality of central processing units if the activity flag of the interrupted central processing unit is not set.

9. The computer system of claim 8, wherein assigning the maintenance tasks previously assigned to the interrupted central processing unit further comprises:

updating a global variable with an id of the interrupted central processing unit or with an id of the another central processing unit to which the maintenance tasks have been assigned;

checking the global variable to identify to which central processing unit of the plurality of central processing units the last maintenance tasks were assigned;

determining whether the global variable assigned is greater than the plurality of central processing units;

assigning the maintenance tasks to the interrupted central processing unit if the global variable assigned is greater than the plurality of central processing units; and assigning the maintenance tasks to another central processing unit of the plurality of central processing units, other than the interrupted central processing unit, whose activity flag is set.

* * * * *